United States Patent
Mashita et al.

(10) Patent No.: US 9,398,372 B2
(45) Date of Patent: Jul. 19, 2016

(54) OPERATION DEVICE, REPRODUCTION SYSTEM, OPERATION METHOD OF OPERATION DEVICE AND PROGRAM

(75) Inventors: Takashi Mashita, Kanagawa (JP); Atsushi Watanabe, Kanagawa (JP); Takanori Harada, Kanagawa (JP)

(73) Assignee: PIONEER DJ CORPORATION, Kanagawa (JP)

( * ) Notice: Subject to any disclaimer, the term of this patent is extended or adjusted under 35 U.S.C. 154(b) by 306 days.

(21) Appl. No.: 13/995,060

(22) PCT Filed: Dec. 15, 2010

(86) PCT No.: PCT/JP2010/007278
§ 371 (c)(1),
(2), (4) Date: Jun. 20, 2013

(87) PCT Pub. No.: WO2012/081054
PCT Pub. Date: Jun. 21, 2012

(65) Prior Publication Data
US 2013/0266155 A1    Oct. 10, 2013

(51) Int. Cl.
*G10H 1/00* (2006.01)
*H04R 3/00* (2006.01)

(52) U.S. Cl.
CPC ............ *H04R 3/00* (2013.01); *G10H 2210/241* (2013.01)

(58) Field of Classification Search
None
See application file for complete search history.

(56) References Cited

U.S. PATENT DOCUMENTS

| 2002/0118302 | A1* | 8/2002 | Iizuka | H04N 9/74 348/578 |
| 2005/0256595 | A1* | 11/2005 | Aiso | H04H 60/04 381/119 |
| 2005/0259532 | A1 | 11/2005 | Roman et al. | |
| 2006/0015198 | A1* | 1/2006 | Okabayashi | G10H 1/0091 700/94 |
| 2006/0028584 | A1* | 2/2006 | Iizuka | H04N 9/74 348/584 |
| 2007/0280489 | A1* | 12/2007 | Roman | H04H 60/04 381/119 |
| 2008/0013756 | A1* | 1/2008 | Roman | G11B 27/105 381/119 |
| 2008/0219478 | A1* | 9/2008 | Aoki | H04H 60/04 381/119 |

FOREIGN PATENT DOCUMENTS

| JP | 2003-202880 | 7/2003 |
| JP | 2009-531807 | 9/2009 |
| WO | WO2007/112420 | 10/2007 |
| WO | WO 2008/117336 | 10/2008 |

OTHER PUBLICATIONS

International Search Report, PCT/JP2010/007278, Jan. 25, 2011.
XONE:4D User Guide AP7265, [online], Allen & Heath Limited, 2008, p. 1,2,17-32, [retrieval date Jan. 14, 2011], Internet<URL:http://www.allen-heath.com/DL/Xone4D_ug_ap7265_2.9df>.

(Continued)

*Primary Examiner* — Thang Tran
(74) *Attorney, Agent, or Firm* — Young & Thompson

(57) ABSTRACT

The DJ controller 10 has a load operation member 82 that loads audio signals to each channel, a synchronization button 84 that realizes a beat synchronization function, and a channel fader 85 that reproduces the loaded audio signals by the fader start function corresponding to each channel.

14 Claims, 13 Drawing Sheets

(56) References Cited

OTHER PUBLICATIONS

XONE:DX with serato ITCH1.7 User Guide AP7820 Issue2, [online], Allen & Heath Limited, Oct. 2010, p. 1,2,11,16-18,21-23,63,64, [retrieval date Jan. 14, 2011], Internet <URL:http://www.serato.com/downloads/files/43504/XoneDX_ITCH_1.7_Manual.pdf>.

Pioneer DJ (DJM-2000), [online], Pioneer Corp., Mar. 2010, p. 1-2, [retrieval date Jan. 14, 2011], Internet <URL:http//pioneer.jp/support/catalog/pdf/dj_mixer_100310.pdf>.

DJ Mixer DJM-2000 Toriatsukai Setsumeisho, [online]. Pioner Corp., Jun. 2010, p. 1, 11-15,23,28, [retrieval date Jan. 14, 2011], Internet <URL:http://www3.pioneer.co.jp/manual/manual_select.php?p_nm=DJM-2000&chr=&page=1>.

Native Instruments Co., "Traktor Pro", Internet URL: http://www.native-instruments.com/#/jp/products/dj/tractor-pro/, 358 pages.

\* cited by examiner

F I G. 5
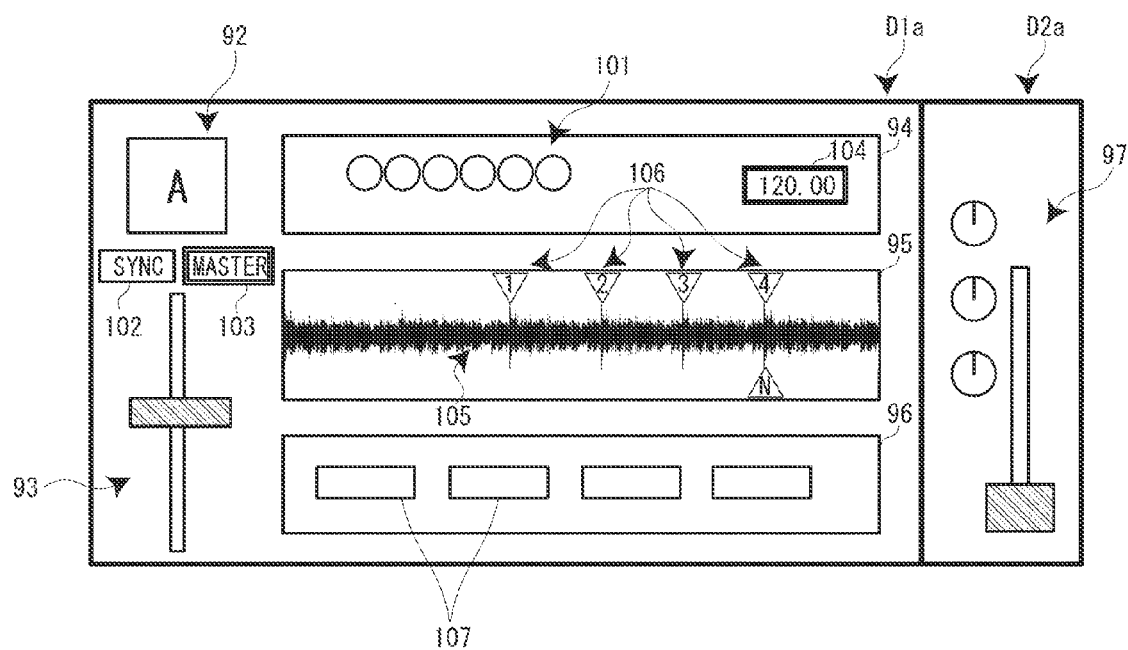

OPERATION DEVICE, REPRODUCTION SYSTEM, OPERATION METHOD OF OPERATION DEVICE AND PROGRAM

TECHNICAL FIELD

The present invention relates to an operation device which controls reproduction of reproduction signals such as audio signals and video signals, a reproduction system, an operation method of the operation device and a program.

BACKGROUND ART

Conventionally, there has been known a DJ controller which is used for acoustic performance by disc jockeys (DJ) as kind of DJ equipment. The DJ controller is used to connect to a computer in which a DJ application is installed, and controls the DJ application by sending operation signals based on user's operations to the computer. While, a structure of a four-deck/four-channel mixer has been commonly used recently as DJ application (for example, see Non-Patent Document 1).

Further, DJ controllers capable of controlling four-deck/four-channel are proposed from each manufacturer with the four decks in such a DJ application. However, if a layout having four-deck/four-channel is adapted in an integral type controller of decks (players) and a mixer, a main frame is oversized. Therefore, each manufacturer uses a structure (layout of two-deck/four-channel) in which only two decks are installed in place of four decks and of which two sides, that is, a front side/a reverse side per each deck can be changed (for example, see Non-Patent Document 2).

[Non-Patent Document 1] Native Instruments Co. "TRAKTOR PRO" http://www.native-instruments.com/#/jp/products/dj/tractor-pro/

[Non-Patent Document 2] Allen & Heath Co. "Xone:DX" http://www.xone.co.uk/dx/

DISCLOSURE OF THE INVENTION

Problems that the Invention is to Solve

It is common for DJs to operate a two-deck/two-channel mixer to reproduce music loaded on each deck alternately one by one and to mix link portions thereof so as to continue to reproduce music in a dance floor. One the other hand, in case that equal to or more than three decks are used, because a plurality of pieces of music can be mixed simultaneously till the next music is reproduced, it is possible to compose unprecedented and original music. At this time, since complicated operations such as a number of deck operations and mixing operations are performed, each deck and mixing operations should give DJs intuition, instantaneousness by which DJs can operate without question and simultaneous operability such that DJs can mix music on one deck at an arbitrary timing while doing performance operations on the other deck. In case that the number of decks and the number of channels are the same in number such as four-deck/four-channel, the above operations are available.

However, as described in the Non-Patent Document 2, in case that operations of four decks are performed in a layout of two-deck/four-channel, since a switching operation of decks is needed to operate decks on each reverse side, the DJs cannot get intuition and instantaneousness and it is not usually possible for the DJs to operate the decks on the reverse side while doing performance operations on the decks of the front side. Further, during the switching of decks is repeated, the DJs may be unconscious which deck is currently assigned and may operate as a deck on an opposite side by mistake. Thus, when the four-deck operations are performed with the conventional two-deck/four-channel DJ controller, since the DJs may lack intuition, instantaneousness and simultaneous operability and may operate incorrectly, leading to much stress for users. As described above, the controller with the layout of the conventional two-deck/four-channel cannot achieve sufficient operability which is normally desired by operations of four decks regarding achievement of original music composition by multi-channel mixing.

In view of the above problem, it is an advantage of the invention to provide an operation device which can fully exert originality of music by multi-channel reproduction, a reproduction system, an operation method of the operation device and a program.

Means for Solving the Problems

According to one aspect of the invention, there is provided an operation device that operates a reproduction control system in which a number of mixable channels is more than a number of decks having a load operation member that loads a reproduction signal to each channel and a play operation member that reproduces the loaded reproduction signal corresponding to each channel for the number of channels.

According to the other aspect of the invention, there is provided an operation method of an operation device that operates a reproduction control system in which a number of mixable channels is more than a number of decks; the operation device having a load operation member corresponding to each channel for the number of channels and a play operation member corresponding to each channel for the number of channels; and the reproduction control system loading a reproduction signal to a deck of a corresponding channel by an operation with the load operation member, and reproducing the reproduction signal in a corresponding channel by an operation with the play operation member.

According to these structures, since the load operation member and the play operation member are provided corresponding to each channel even in the operation device that operates the reproduction control system having fewer decks than the mixable channels, while a deck operation is performed on an arbitrary channel, it is possible to load the reproduction signals on the other channel and to reproduce the reproduction signals loaded on the other channel at an arbitrary timing by the reproduction control system. For example, in case of two-deck/four-channel DJ controller, though it is generally possible to switch a front side/reverse side of each deck, a track on the reverse side can be loaded and reproduced without switching the decks while a track is operated on a front side of the deck. Thus, since each channel can be directly operated even a four-deck operation is performed on the two-deck/four-channel DJ controller, music originality can sufficiently be generated. Further, since the number of switching decks can be decreased, incorrect operations can be reduced.

A "deck area" indicates an operation area of the device by which a reproduction function for the reproduction signals is operated, and the "device by which a reproduction function for the reproduction signals" indicates a concept including a DJ player and a DJ effector. Further, the operation device does not necessarily have hardware, but may be realized by an application (software).

Further, the "reproduction signals" may be either audio signals or video signals. A configuration may also be taken in which some channels may be loaded with the audio signals and other channels may be loaded with the video signals among all channels. Shortly, the reproduction control system may be acoustic equipment, video equipment, or complex equipment (AV equipment) thereof.

In the operation device described above, it is preferable that the play operation member be either a fader operation member that realizes a fader start function.

According to the structure, since the fader start function can be realized, a reproduction operation of the reverse side deck can be done by one action in which the channel fader is moved without a deck switching operation. Therefore, performance with high originality can easily be done. While, in case that a play button as play operation member is provided, two actions of pressing the play button and adjusting volume by the channel fader are needed, resulting in a lack of instantaneousness.

The "fader start function" functions to switch between a cue wait state and a reproduction state and to adjust a mixing rate (including volume and a level) by one fader operation.

In the operation device described above, it is preferable that a fader start switching operation member that switches validation/invalidation of the fader start function be further provided corresponding to each channel or all channels.

According to the structure, it is possible to switch whether to use the fader start function based on user's needs or an atmosphere.

In case that the fader start function is switched to "invalidation", it is preferable that not an operation itself of the fader operation member be regarded as invalidation but the fader operation member function as operation member for adjusting the mixing rate (note that the switching between the cue wait state and the reproduction state is not performed by the fader operation member).

In the operation device described above, it is preferable that a cue select operation member that selects a cue point as a reproduction start position in the fader start out of a plurality of cue point candidates be further provided corresponding to each channel.

According to the structure, since a cue point at the time of fader start can be selected, various performance can be realized.

The "cue select operation member" may be implemented by one operation member or by a plurality of operation members. In the former case, the one operation member may select sequentially from a cue point candidate at a beginning side of a reproduction content and return to the beginning from the last cue point candidate. While, in the latter case, two operation members may be provided, one of which being a forward operation member that selects a cue point candidate sequentially from the beginning side to an end of the reproduction content and the other of which being a back operation member that selects a cue point candidate sequentially from the end side to the beginning of the reproduction content.

In the operation device described above, it is preferable that a synchronization operation member that realizes a beat synchronization function be further provided corresponding to each channel.

According to the structure, it is possible to reproduce reproduction signals loaded on the other channel without tempo fluctuation (in synchronization with the main reproduction signals) while reproducing reproduction signals as master on an arbitrary channel.

The "beat synchronization function" indicates a function that synchronizes master music to beats of slave music BPM (Beats Per Minute). Shortly, BPM and beat adjustments with a tempo slider and a pitch bend performed by a DJ manually on DJ conventional equipment is automated.

In the operation device described above, it is preferable that an operation area of the operation device include one or more deck areas where the deck is operated and a mixer area where a mixing operation is performed, and the load operation member and the play operation member be arranged in the mixer area.

According to the structure, a user can recognize that all channels can be operated directly in the mixer area regardless of which channel currently corresponds to each deck by arranging the load operation member and the play operation member in the mixer area.

In the operation device described above, it is preferable that the mixer area include an operation member area by channel in which an operation member group corresponding to each channel for the number of channels is arranged in line, and the load operation member and the play operation member be arranged in the operation member area by channel of a corresponding channel.

According to the structure, since the load operation member and the play operation member are arranged in the operation member area by channel provided per channel, the user can discriminate a corresponding channel instantly. Further, this makes incorrect operations be reduced.

In the operation device described above, it is preferable that a plurality of the deck areas be installed, each of the deck areas be preliminary assigned to two or more channels, and a deck switching operation member be arranged that switches to function as a deck of which channel among the two or channels.

According to the structure, since two or more channels are preliminary assigned to each deck (each deck area) respectively, the user can easily recognize which channel corresponds to which deck. Further, since the number of all channels is assigned to each deck, the number of channels assigned to each deck becomes fewer, resulting in an easy deck switching operation.

In the operation device described above, it is preferable that a deck switching operation member be arranged that switches to function as a deck of which channel among the plurality of channels in at least one deck area among the one or more deck areas.

According to the structure, since reproduction operations for a plurality of channels can be done in one deck area, at least only one deck may be installed in the operation device. Thus, the device can be miniaturized and cheaper.

In the operation device described above, it is preferable that a fader operation member for plural operation that realizes the fader start function simultaneously to the plurality of channels be further provided.

According to the structure, it is possible to reproduce without out of timing for the plurality of channels. Especially, when many channels are installed, the structure is effective.

In the operation device described above, it is preferable that a fader start switching operation member for plural operation that switches validation/invalidation of the fader start function by the fader operation member for plural operation be further provided corresponding to each channel or all channels.

According to the structure, it is possible to set channels as operated targets of the fader operation member for plural operation by which the fader start of two channels or all channels are operated. Thus, performance with high originality can be realized.

In the operation device described above, it is preferable that the fader start switching operation member for plural operation be arranged adjacent to the fader operation member for plural operation.

According to the structure, the user can easily recognize the channels as operated targets in operating the fader operation member for plural operation.

In the operation device described above, it is preferable that a cross fader operation member that adjusts a mixing rate of the reproduction signal loaded in each channel, and an assignment switching operation member that switches each channel to either a first end or a second end of the cross fader operation member be further provided.

According to the structure, performance with higher originality can be realized by installing a cross fader function.

In the operation device described above, it is preferable that the assignment switching operation member have an assignment switching operation member for a first end that switches whether to assign to the first end of the cross fader operation member and an assignment switching operation member for a second end that switches whether to assign to the second end of the cross fader operation member, and the assignment switching operation member for a first end and the assignment switching operation member for a second end be provided corresponding to each channel.

According to the structure, since the two assignment switching operation members for the first end and the second end are provided corresponding to each channel, the assignment switching operation can be easily discerned.

In the operation device described above, it is preferable that the assignment switching operation member for a first end corresponding to each channel for the number of channels be arranged adjacent to the first end of the cross fader operation member, and the assignment switching operation member for a second end corresponding to each channel for the number of channels be arranged adjacent to the second end of the cross fader operation member.

According to the structure, assignment switching operation members for the number of channels are provided adjacent to the first end and the second end of the cross fader operation member respectively, the user can easily acknowledge which end is assigned to each channel.

A reproduction system of the invention has the operation device described above, and a multi-channel audio/video application that is installed in a computer and functions as the reproduction control system.

According to the structure, the invention is applicable to a controller (a DJ controller, a VJ controller, a DVJ controller and the like) for performance in combination with an audio/video application.

A program of the invention causes a computer to function as the load operation member and the play operation member in the operation device described above.

The operation device capable of exerting originality of music in multi-channel reproduction substantially by using the program can be realized.

BRIEF DESCRIPTION OF THE DRAWINGS

FIG. 5 is an enlarged screen diagram of a display area by channel of the DJ application.

DESCRIPTION OF EXEMPLARY EMBODIMENTS

An operation device, a reproduction system, an operation method of the operation device and a program according to one embodiment of the invention will be explained in detail with reference to accompanying drawings. In the embodiment, a DJ controller 10 as kind of DJ equipment is exemplified as operation device and a DJ performance system (simply "DJ system" hereinafter) using the DJ controller 10 will be explained.

First Embodiment

Figure 1:
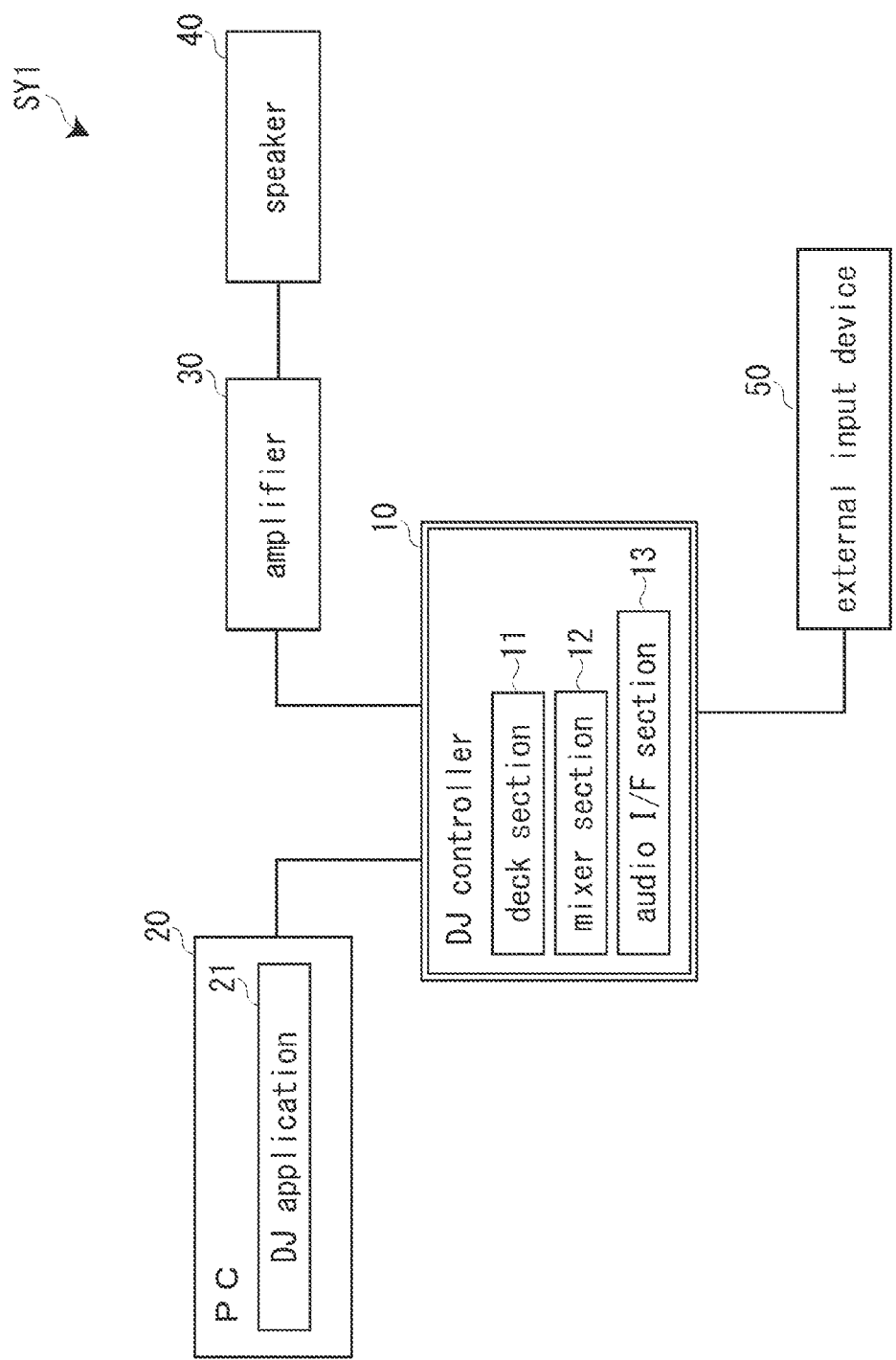
FIG. 1 is a system structure diagram of a DJ system according to one embodiment of the invention.

FIG. 1 illustrates a system structure diagram of a DJ system SY1. As illustrated in FIG. 1, the DJ system SY1 has the DJ controller 10 (operation device) as an integral type controller of a deck and a mixer, a personal computer (referred as "PC 20" hereinafter) installed with a DJ application 21 (reproduction control system), an amplifier 30 as amplification equipment, a speaker 40 which outputs audio, and an external input device 50 which is used for inputting audio signals (reproduction signals). An audio reproduction device such as a CD player and a microphone or the like may be used as the external input device 50. Further, a plurality of external input devices 50 may be provided. Still further, if the PC 20 can reproduce audio signals supplied from a USB memory or the like, the external input device 50 may be omitted.

The DJ controller 10 has a deck section 11 which operates a reproduction function of the audio signals, a mixer section 12 which mixes the audio signals as mixer, and an audio interface section (referred as "audio I/F section 13 hereinafter) which inputs/outputs the audio signals as main functional structures. The deck section and the mixer section 12 transmit operation signals (MIDI codes or HID codes assigned to operation members such as buttons) to the PC 20 (DJ application 21) through communication such as MIDI or HID. Further, the DJ controller 10 receives LED on/off information of buttons from the PC 20 and turns on/off LEDs.

While, the audio I/F section 13 outputs the audio signals input from the external input device 50 to the PC 20 and outputs the audio signals input from the PC 20 to the amplifier 30. Further, the audio I/F section performs A/D conversion and D/A conversion for the audio signals.

The PC 20 has hardware (not illustrated) such as a display screen, input devices (such as a mouse and a keyboard), a hard disk, and a control mechanism (CPU, ROM, RAM and the like). Further, the hard disk stores an OS (Operating System) and the DJ application 21 operating on the OS. The DJ application 21 is software developed for DJs' performance and processes and edits the audio signals input from the DJ controller 10. Further, the DJ application 21 can realize functions of a DJ player and a mixer by using the DJ controller in combination. In other words, the DJ controller 10 is used as interface for a user to perform various operations, and audio control (such as mixing the audio signals and volume adjustment) is mainly performed by the DJ application 21 (PC 20). The DJ application 21 according to the embodiment can display four-deck/four-channel structure, that is, decks corresponding to the four channels, respectively.

Figure 2:
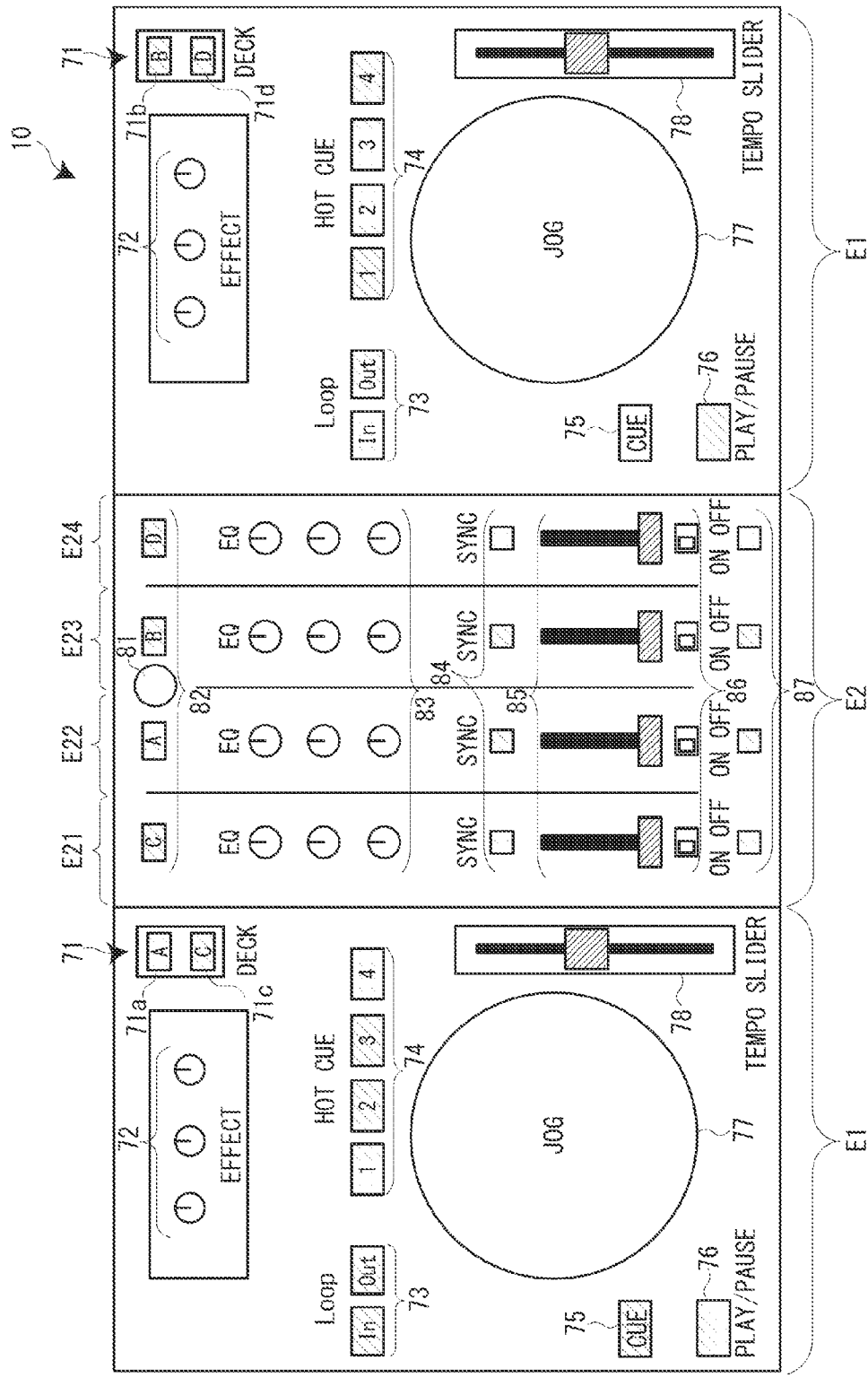
FIG. 2 is a plan view of a DJ controller.
Figure 3:
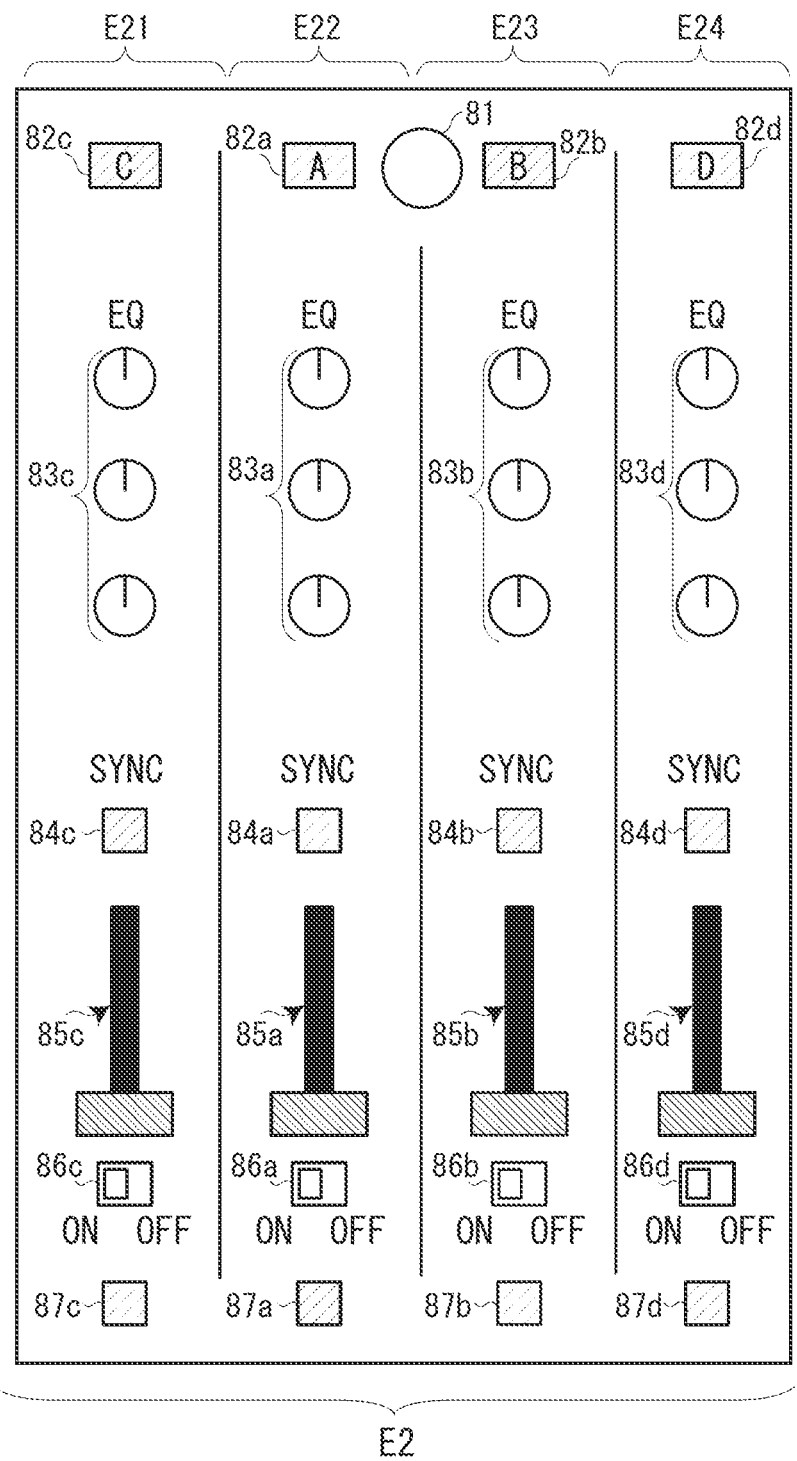
FIG. 3 is an enlarged plan view of a mixer area of the DJ controller.

Referring to FIGS. 2 and 3, various operation members provided on the DJ controller 10 will be explained. FIGS. 2 and 3 are plan views of the DJ controller 10 seen from above. FIG. 2 is a diagram illustrating an operation area corresponding to overall top face of the DJ controller 10 and FIG. 3 is an enlarged view of a mixer area E2 as a part of the operation area.

As illustrated in FIG. 2, the operation area of the DJ controller 10 includes the mixer area E2 used for mixing operations and two deck areas E1 used for deck (player) operations. The two deck areas E1 are arranged at the right side and the left side having the mixer area E2 therebetween, and a channel A and a channel C are preliminary assigned to the deck area E1 at the left side. Therefore, on the deck area E1 at the left side, the audio signals assigned to the channel A or the channel C can be operated. While, a channel B and a channel D are preliminary assigned to the deck area E1 at the right side and the audio signals assigned to the channel B or the channel D can be operated.

A deck switching button 71 (deck switching operation member) is arranged at the upper right portion of each deck area E1. For example, in case of the deck area E1 at the left side, when the deck switching button 71a is pressed, the deck area E1 functions as a deck corresponding to the channel A. Further, when the deck switching button 71c is pressed, the deck area E1 functions as a deck corresponding to the channel C. In other words, decks on a front side (decks currently in operation) and decks on a reverse side can be switched by operating the deck switching button 71.

Besides, various operation members provided on a general DJ player are arranged in each deck area E1. For example, an effect tab group 72 used for expressing various effects, a loop button 73 (a loop-in button/a loop-out button) used for loop reproduction (repetitive reproduction), a hot cue button 74 used for recording and recalling cue points, a cue button 75 used for setting cue points, a play/pause button 76 used for reproduction or pause, a jog dial 77 used for forward/reverse reproduction and varying reproduction speed, a tempo slider 78 used for adjusting reproduction speed (tempo), and the like are provided thereon.

The effect tab group 72 includes a delay button used for setting delay sounds at arbitrary tempo/rhythm, an echo button used for setting echo sounds at arbitrary tempo, a pitch echo button used for setting the echo sounds to original sounds at arbitrary pitch, a trans button used for cutting the original sounds along with BPM intermittently, a flanger button used for generating effect sounds as if a jet plane goes up and down periodically, a filter button used for changing the original sounds to hollow sounds by applying a low-pass filter, a phase button used for adding phase shifting sounds to the original sounds, and the like.

While, as illustrated in FIGS. 2 and 3, a rotary encoder 81 for track browsing is arranged on the upper center of the mixer area E2. The rotary encoder 81 is used for moving a cursor within a track list (see a browser display area D3 in FIG. 4) displayed on a display screen D on the DJ application 21.

Further, in the mixer area E2, operation member areas by channel E21, E22, E23 and E24 are provided per channel, each of which having an operation member group in line corresponding to each channel. The four operation member areas by channel E21, E22, E23 and E24 correspond to the channel C, the channel A, the channel B and the channel D from the left.

Each operation member area by channel E21, E22, E23 and E24 includes a load button 82 (load operation member), an equalizer tab 83, a synchronization button 84 (synchronization operation member), a channel fader 85 (fader operation member), a channel fader start ON/OFF switch 86 (fader start switching operation member), and a cue select button 87 (cue select operation member) as operation member group corresponding to each channel. In FIG. 3, the operation member groups included in the operation member areas by channel E21, E22, E23 and E24 are illustrated as XXc, XXa, XXb and XXd based on alphabets of the corresponding channels (channel C, channel A, channel B, channel D).

The load button 82 is a button used for loading a track pointed by the cursor in the track list on a corresponding channel (deck). It is possible to load the track on a deck at the reverse side without using the deck switching button 71 on each deck area E1 because the load button 82 is provided by channel.

The equalizer tab 83 has three tabs which are used for adjusting levels of high tone, intermediate tone and low tone, respectively.

The synchronization button 84 is a button used for synchronizing BPM and beat (or a beat grid) of a corresponding channel (deck) with BPM and beat of a master deck. It is possible to start to reproduce the track loaded on the reverse side without changing tempo because the synchronization button 84 is provided by channel.

The channel fader 85 is a fader used for adjusting volume, but functions as operation member for realizing a fader start function by switching a channel fader start ON/OFF switch 86 to "ON". Shortly, when the channel fader start ON/OFF switch 86 is "ON", volume adjustment and reproduction/resume from a cue point 106 (see FIG. 5) can be done. While, when the channel fader start ON/OFF switch 86 is "OFF", only the volume adjustment can be done. Thus, music can be reproduced instantly and easily by making the fader start function feasible. Further, providing the channel fader start ON/OFF switch 86 allows the user to switch whether or not the fader start function is used based on user's needs or a situation at the occasion. The fader start function will be explained with reference to FIG. 6 later.

The cue select button 87 is a button used for selecting sequentially one of a plurality of selected cue points 106 in one track. The cue points 106 are set by the cue button 75 or the like and can be checked on the display screen D of the DJ application 21. Thus, since reproduction start position can be changed by providing the cue select button 87 by channel, it is possible to realize musical performance having higher originality. The selection of cue points 106 will be described with reference to FIG. 5 later.

As illustrated in FIGS. 2 and 3, the load button and the synchronization button 84 which are usually arranged on the deck area E1 are arranged on the mixer area E2 by channel. Therefore, it is possible to perform operations for four decks instantly and intuitively even the DJ controller 10 having fewer decks than channels is used as the embodiment. Generally, DJs reproduce tracks alternately by using two decks. Thus, two decks (for example, deck A and deck B) out of four decks are occupied with a track currently reproduced and a track subsequently reproduced. In this case, it is conceivable about usage of the remaining two decks "1. to load any track or sounds (such as vocal sounds and effect sounds) on the deck C and/or the deck D, and to additionally reproduce with the track reproduced by the deck A and/or deck B at an arbitrary timing", "2. to reproduce an instrument part (for example, synthesizer sounds as melody) on the deck A and/or deck B, and to execute loop reproduction (to compose one track using a plurality of decks) of the other instrument part (for example, a bass drum or a high-hat) on the deck C and/or the deck D, or the like.

In case that such usage of the DJ controller 10 is assumed, operations of adding the vocal sounds, effect sounds, instrument part sounds on the third or the fourth deck easily and promptly at an arbitrary timing are required while the melody music is being reproduced alternately by the two decks. In that point, since the DJ controller 10 of the embodiment has a load button 82 and a channel fader 85 capable of realizing the fader start function per channel, it is possible to load the audio signals on the third or the fourth deck and to start the reproduction at an arbitrary timing without the need for deck switching operation. Since the synchronization button 84 is also provided per channel, tempo adjustment for music can be done at one touch, and, since the cue select button 87 is provided per channel, it is possible to start to reproduce music from a desired reproduction point.

Thus, according to the DJ controller 10 of the embodiment, since the load function, the synchronization function, the cue reproduction/back cue function which are required minimally as DJ player function can be operated per channel directly, operations as equivalent level as those of a four-deck layout can be performed even the two-deck layout is actually provided, and the user can sufficiently generate originality of music searched for four-deck operations (multi-channel reproduction). Further, supposing that the deck for the melody is set on deck A and/or the deck B and the deck for adding sounds is set on deck C and/or the deck D (reverse decks of the deck A and the deck B), the two deck areas E1 can be used for the deck A and the deck B for the melody fixedly. Therefore, it is possible for the user to easily acknowledge which channel can now be operated and mistaken operations can be decreased.

Figure 4:
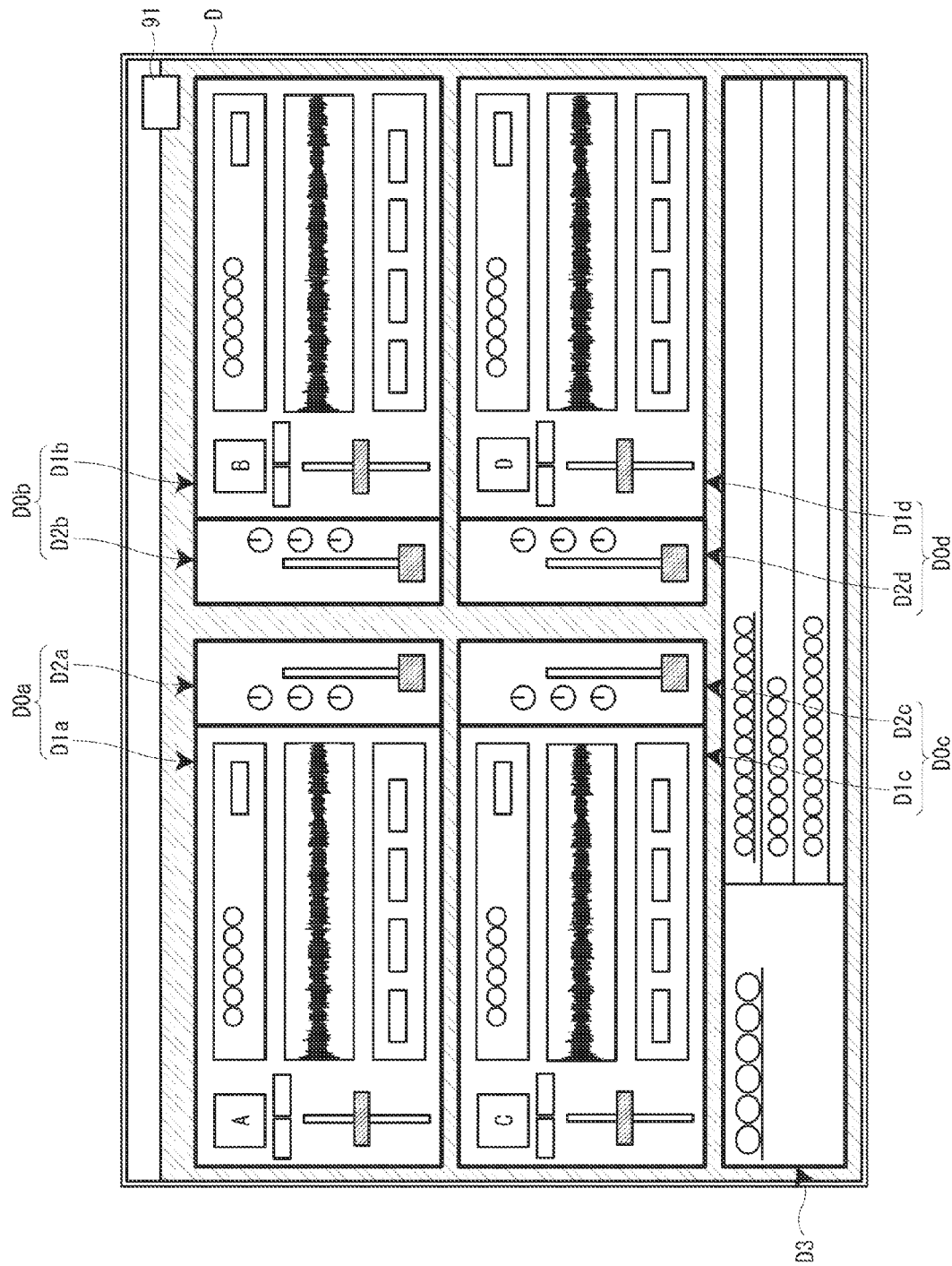
FIG. 4 is a diagram illustrating a display screen of a DJ application.

Referring to FIGS. 4 and 5, the display screen D of the DJ application 21 and operations on the DJ controller 10 affected on the display screen D will be explained. FIG. 4 is a diagram illustrating the whole display screen D and FIG. 5 is an enlarged view of a display area by channel D0 as a part of the display screen D.

As illustrated in FIG. 4, the display screen D has four display areas by channel D0 and a browser display area D3 displaying the track list. In the four display areas by channel D0, the upper left, the upper right, the lower left and the lower right correspond to the deck A, the deck B, the deck C and the deck D (the channel A, the channel B, the channel C, the channel D), respectively. Further, each display area by channel D0 has a deck display area D1 and a mixer display area D2.

As illustrated in FIG. 5, the deck display area D1 has a channel display area 92 displaying a channel name of a corresponding channel such as "A", "B", a slider display area 93 affected by an operation result of the tempo slider 78, an information display area 94 displaying track information, a waveform display area 95 displaying music waveform 105, and a deck operation member display area 96 affected by operation results of various operation members provided on the deck area E1 of the DJ controller 10. Further, a synchronization icon 102 which is lit up when a "slave" is set in synchronization reproduction and a master icon 103 which is lit up when a "master" is set in the synchronization reproduction are displayed between the channel display area 92 and the slider display area 93.

In the information display area 94, track information 101 such as names of the loaded track or an artist and BPM information 104 of the track is displayed. As to the BPM information 104, in case that the deck A as an example is set as the "master" in the synchronization reproduction and the synchronization button 84 of the deck B (channel B) in the mixer area E2 of the DJ controller 10 is pressed, the BPM information 104 displayed on the information display area 94 of the deck B is set to the BPM of the deck A and the beat synchronizes simultaneously (in case of the example in FIG. 5, the BPM is set at "120.00"). Thus, when the track on the deck B is reproduced, the beat thereof synchronizes with that of the deck A.

In the waveform display area 95, the music waveform 105 and the set cue points 106 are displayed. The user can recognize whether the track is loaded or not (whether or not the track is in a reproducible state) based on the music waveform 105 displayed on the waveform display area 95. A track is loaded by pressing the load button 82 of a corresponding channel in the mixer area E2 of the DJ controller 10. Further, based on displaying the cue points 106, the user can reproduce from each cue point and select each cue point while checking points of the cue points 106 visually set by the hot cue button. The cue points 106 are selected by pressing a cue select button 87 of a corresponding channel in the mixer area E2 of the DJ controller 10. Specifically, every time the cue select button 87 is pressed, a cue point candidate (upside-down triangle mark in the figure) from a beginning side of the track is sequentially selected (selected sequentially in the order of the number "2" . . . ), and after the last cue point candidate is selected, the first cue point candidate is selected again. The triangle mark having an alphabet "N" therein indicates the cue point 106 currently selected.

The deck operation member display area 96 has an icon group 107 which displays states of the effect tab group 72, the loop button 73, the hot cue button 74, the cue button 75, the play/pause button 76 provided on the deck area E1 of the DJ controller 10.

While, the mixer display area D2 has a mixer operation member display area 97 affected by operation results of the various operation members provided in the operation member areas by channel E21, E22, E23 and E24 of corresponding channels in the mixer area E2 of the DJ controller 10. Specifically, the states of the equalizer tab 83 and the channel fader 85 are displayed. In case that the DJ application 21 is designed along with the DJ controller 10 of the embodiment, states of the load button 82, the synchronization button 84, the channel fader start ON/OFF switch 86 and the cue select button 87 may be displayed on the mixer operation member display area 97.

The display screen D of the DJ application 21 may be a two-deck layout displaying only the deck A and the deck B (or two decks selected by the user) instead of the four-deck layout illustrated in FIG. 4. Further, the four-deck layout and the two-deck layout may be switchable by clicking the display switching icon 91 arranged on the upper right portion of the display screen D. Thus, the browser display area D3 can be maintained widely by the selectable two-deck layout and labor time for switching screens can be decreased. Further, in the embodiment, though the DJ controller 10 having four-deck structure is used, as described above, since two decks (the deck A and the deck B) can be fixedly used as main decks because of the various operation members which can directly operate each channel in the mixer area E2, it is not inconvenient to set the display screen D of the DJ application 21 as two-deck layout.

Figure 6A:
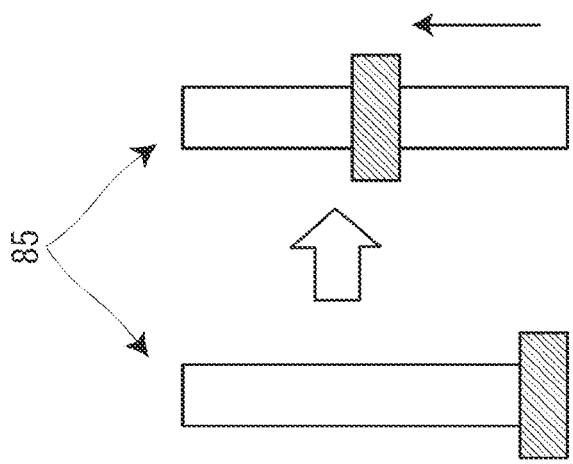
FIGS. 6A, 6B and 6C are explanatory views of a fader start function by a channel fader.
Figure 6B:
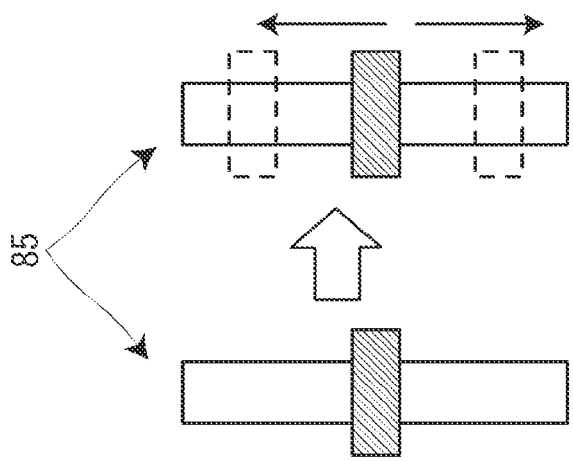
Figure 6C:
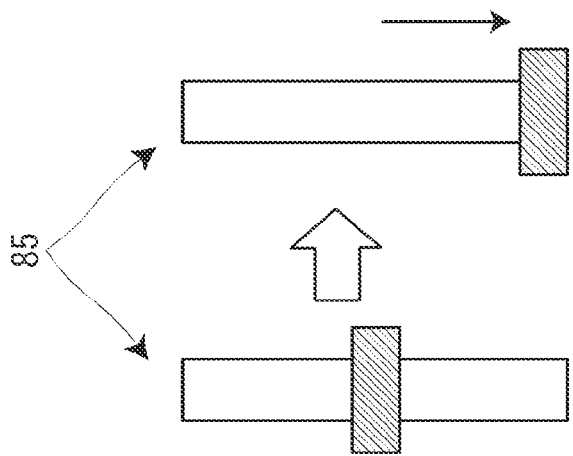

Referring to FIGS. 6A to 6C, the fader start function will be explained. In case that the channel fader start ON/OFF switch 86 is set to "ON", the DJ application 21 receives a fader start request from the DJ controller 10 and acts as follows. Channel fader volume request value is set between the minimum value "0" (the lowest) and the maximum value "127" (the highest).

For example, as illustrated in FIG. 6A, when the channel fader 85 is raised from the lowest position, a play action starts only from a cue wait state with a channel fader volume action. In other words, when the channel fader volume request value changes from "0" to "1" during the reception of the fader start request, the DJ application 21 keeps a play state if it is in a play mode and the volume value is set to a value based on the fader position. Further, if the DJ application 21 is in a pause mode, the fader start action is invalidated and the volume value is set to a value based on the fader position. Still further, if the DJ application 21 is in a cue wait mode, the reproduction starts when the channel fader volume request value changes from "0" to "1" and the volume value is set to a value based on the fader position.

Further, as illustrated in FIG. 6B, in case that the channel fader 85 has been already raised, the channel fader volume action is taken. Shortly, when the channel fader volume request value changes between "1" and "127" during the reception of the fader start request, the DJ application 21 keeps the play state if it is in the play mode and the volume value is set to a value based on the fader position. Further, if the DJ application 21 is in the pause mode, the fader start action is invalidated and the volume value is set to a value based on the fader position. Still further, if the DJ application 21 is in the cue wait mode, the fader start action is also invalidated and the volume value is set to a value based on the fader position.

Still further, as illustrated in FIG. 6C, in case that the channel fader 85 is moved from the raised position to the lowest position, the cue is moved backwardly from the reproduction state to be in the cue wait state with the channel fader volume action. In other words, when the channel fader volume request value changes from "1" to "0" during the reception of the fader start request, the DJ application 21 returns to the set cue point 106 from the play state to be in the cue wait state if it is in the play mode. Further, the volume value is set to a value based on the fader position. Still further, if the DJ application 21 is in the pause mode, the fader start action is invalidated and the volume value is set to a value based on the fader position. Moreover, if the DJ application 21 is in the cue wait mode, the fader start action is also invalidated and the volume value is set to a value based on the fader position.

As explained above, according to the DJ system SY1 of the embodiment, since even the DJ controller 10 in which the number of decks is fewer than the number of mixable channels has the load button 82 and the channel fader 85 capable of realizing the fader start function corresponding to each channel, it is possible to load and to start to reproduce a track on the reverse side without switching the decks when a track is operated on the front side of the deck. In other words, sounds can be added to the deck of the reverse side without disturbing deck operations (such as scratch play using the loop, the hot cue and the jog dial 77) on the front face.

Especially, the DJ controller 10 of the embodiment is used for performing such as DJ mix, scratch and the like while the DJ selects tracks based on atmosphere of a floor. With the DJ mix, since a track currently reproduced and a track reproduced next are smoothly linked and discontinuity of sounds is gotten rid of, bright and cheerful atmosphere of the floor is maintained. Therefore, it is very important that the DJ controller 10 gives instantaneous and intuitive operations to the DJ, compared with other music reproduction devices. Further, performance originality is needed for distinctive DJ equipment. Moreover, since substantial bad effect to the atmosphere could be given by sound discontinuity, any mistaken operations should not be tolerated. According to the embodiment, since each channel can be directly operated even if four-deck operation is performed with the two-deck/four-channel DJ controller 10, there is no burden of deck switching, mistaken operations can be decreased, and various musical performance can be done instinctively. Thus, it is possible to realize performance with high originality and to broaden DJ style.

In the above embodiment, the cue select button is implemented with one operation member, but may be implemented with a plurality of operation members. In this case, two buttons, one of which is a forward button used for selecting a cue point candidate from a beginning to an end of a track sequentially and the other of which is a back button used for selecting a cue point candidate from the end to the beginning of the track, may be provided. Further, a plurality buttons corresponding to the plurality of cue points 106 by 1:1 may be provided. In this case, the cue points 106 can be set as many as the installed buttons per track.

Further, the cue select button 87 may be omitted. In this case, though the fader start can be done only from one cue point 106 in one track, the DJ controller 10 can be smaller and cheaper because the operation members become fewer.

Further, in the embodiment above, in case that the channel fader start ON/OFF switch 86 is set to "ON", the DJ application 21 always receives the fader start request from the DJ controller 10 and performs switching control between the cue wait state and the reproduction state based on operation signals of the channel fader 85, but the switching control may be performed at the DJ controller 10 side. Shortly, the DJ controller 10 only transmits "the volume value based on the channel fader 85 position" when the channel fader start ON/OFF switch 86 is set to "OFF", and transmits "the volume value based on the channel fader 85 position" when it is set to "ON" and further transmits "information to reproduce from the cue point" when the fader value changes from "0" to "1". Further, when the fader value changes from "1" to "0", "information to return to the cue point to be in the cue wait state" is also transmitted in addition to "the volume value based on the channel fader 85 position". Thus, the switching control is not necessary at the DJ application 21 side by changing transmitted information based on the state of the channel fader start ON/OFF switch 86.

Further, in the embodiment above, as one example of the operation device, the DJ controller 10 having the deck area E1 and the mixer area E2 is exemplified, but the operation device may have only the mixer area E2. Still further, the operation device may have only particular operation members (such as the load button 82, the synchronization button 84, the channel fader 85, the channel fader start ON/OFF switch 86 and the cue select button 87) in the mixer area E2.

Second Embodiment

Figure 7:
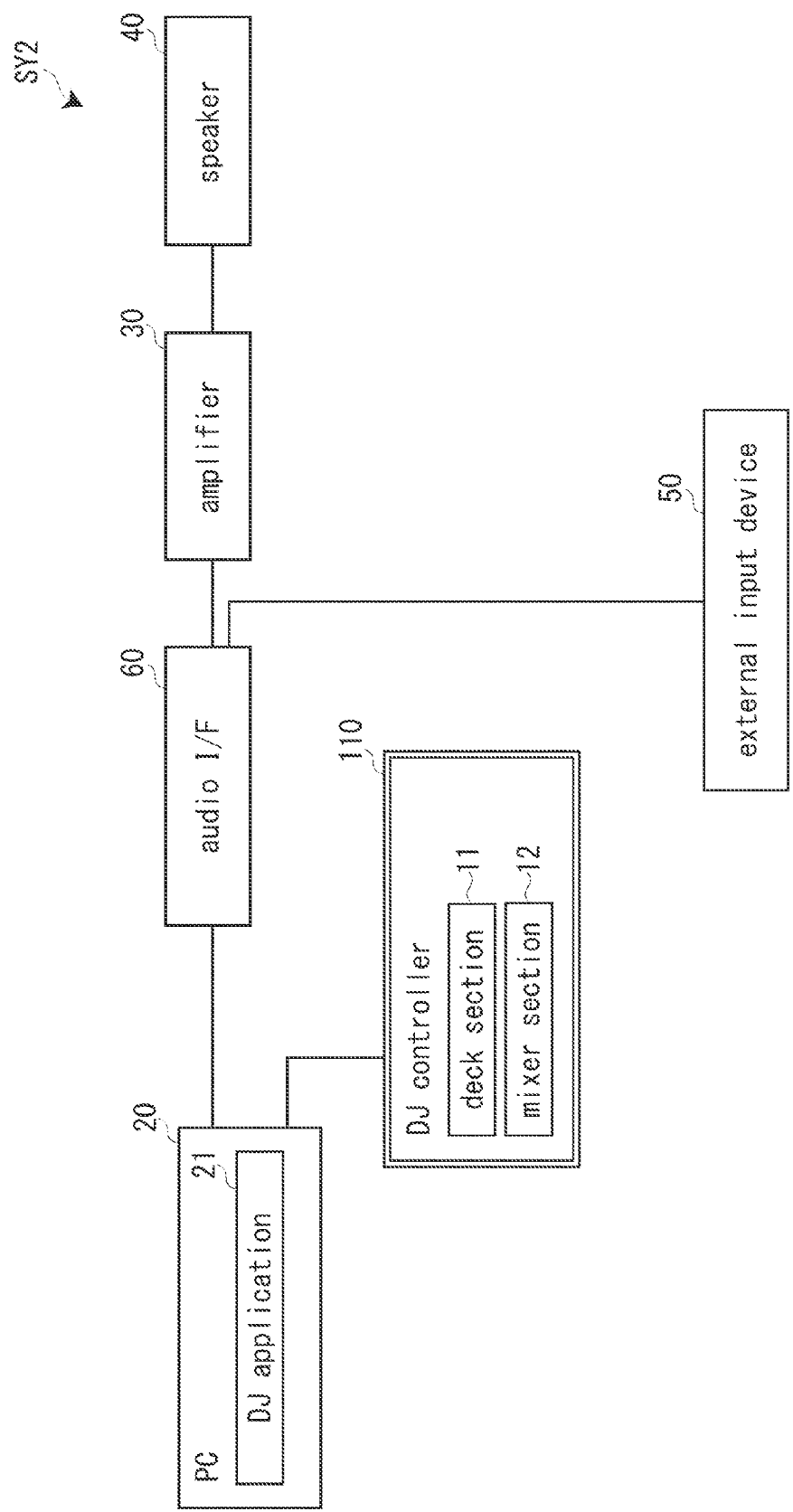
FIG. 7 is a system structure diagram of the DJ system according to the second embodiment.

Referring to FIG. 7, the second embodiment of the invention will be explained. In the embodiment, the same structure elements as those in the first embodiment are given with the same reference numbers and a detailed explanation thereof is omitted. Modifications applied to the same structure elements as those in the first embodiment are also applied to the embodiment.

FIG. 7 illustrates a system structure diagram of a DJ system SY2 according to the second embodiment. The DJ system SY2 of the embodiment has a DJ controller 110 as integrated type controller of a DJ player and a DJ mixer, the PC 20 having the DJ application 21 installed therein, the amplifier 30 as amplifying equipment, the speaker 40 which outputs audio, the external input device 50 which is used for inputting the audio signals, and an audio interface 60. The audio interface 60 is added, compared with the first embodiment (see FIG. 1).

The DJ controller 110 has the deck section 11 which corresponds to a DJ player function and the mixer section 12 which corresponds to a DJ mixer function as main functional structures. Since the audio interface 60 is added, the audio I/F section 13 is omitted in the DJ controller 110. While, the audio interface 60 outputs the audio signals input from the external input device 50 to the PC 20, and outputs the audio signals input from the PC 20 to the amplifier 30. Further, the audio interface 60 performs A/D conversion and D/A conversion for the audio signals.

Thus, as compared with the DJ controller 10 according to the first embodiment, since the DJ controller 110 according to the second embodiment of the invention has the structure in which the audio I/F section 13 is omitted, control load and device cost can be reduced.

Third Embodiment

Figure 8:
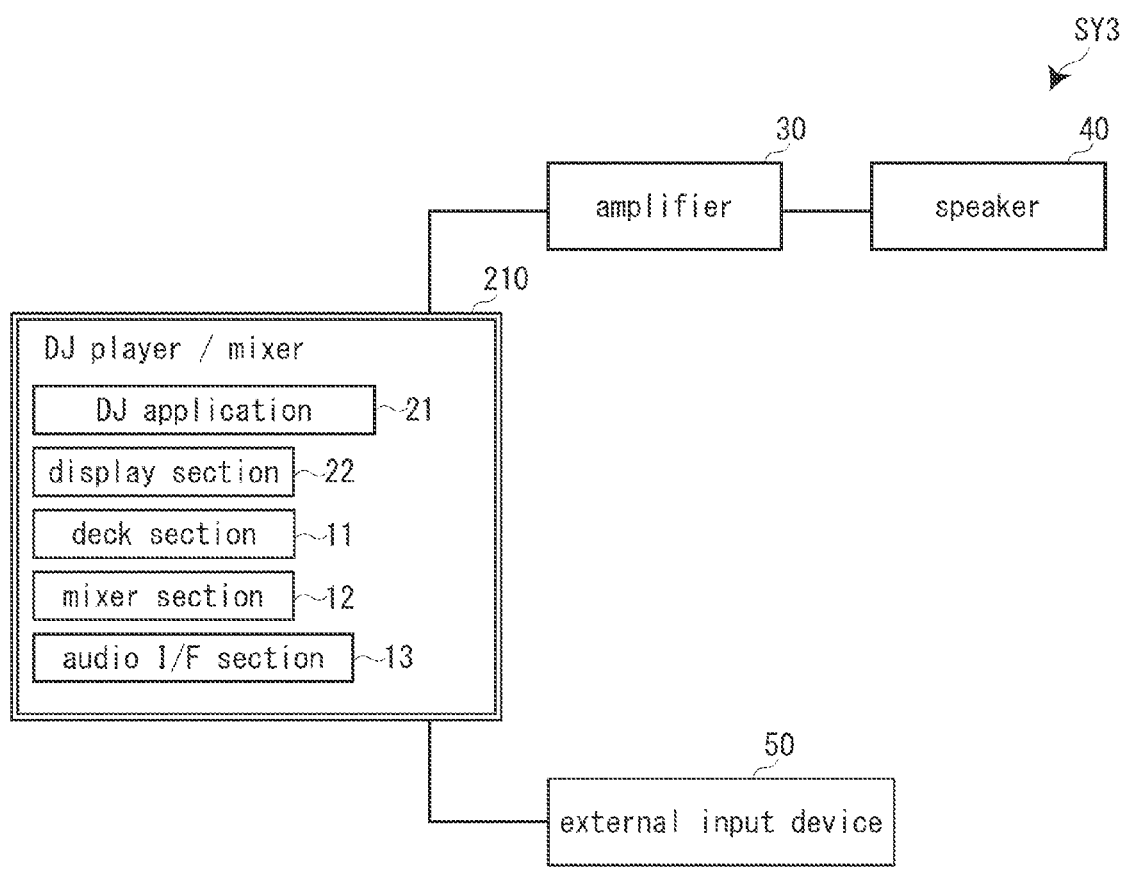
FIG. 8 is a system structure diagram of the DJ system according to the third embodiment.

Referring to FIG. 8, the third embodiment of the invention will be explained. FIG. 8 illustrates a system structure diagram of a DJ system SY3 according to the third embodiment. The DJ system SY3 has a DJ player/mixer 210 (reproduction control system, operation device) as integral type device of a DJ player and a DJ mixer, the amplifier 30 as amplification equipment, the speaker 40 which outputs audio, and the external input device 50 which is used for inputting audio signals. In other words, the embodiment has a structure in which the PC 20 is omitted, compared with the first embodiment (see FIG. 1).

The DJ player/mixer 210 has the DJ application 21, a display section 22, the deck section 11 and the mixer section 12 as main functional structures. In short, the DJ application 21 and the display section 22 are added to the DJ player/mixer 210 along with the omission of the PC 20. The display section 22 is used for displaying the whole display screen D or a partial portion such as a browse portion.

Thus, since the DJ system SY3 according to the third embodiment of the invention does not need the PC 20 compared with the DJ system SY1 according to the first embodiment, it is possible to simplify the system structure and to conserve arrangement space.

Fourth Embodiment

Figure 9:
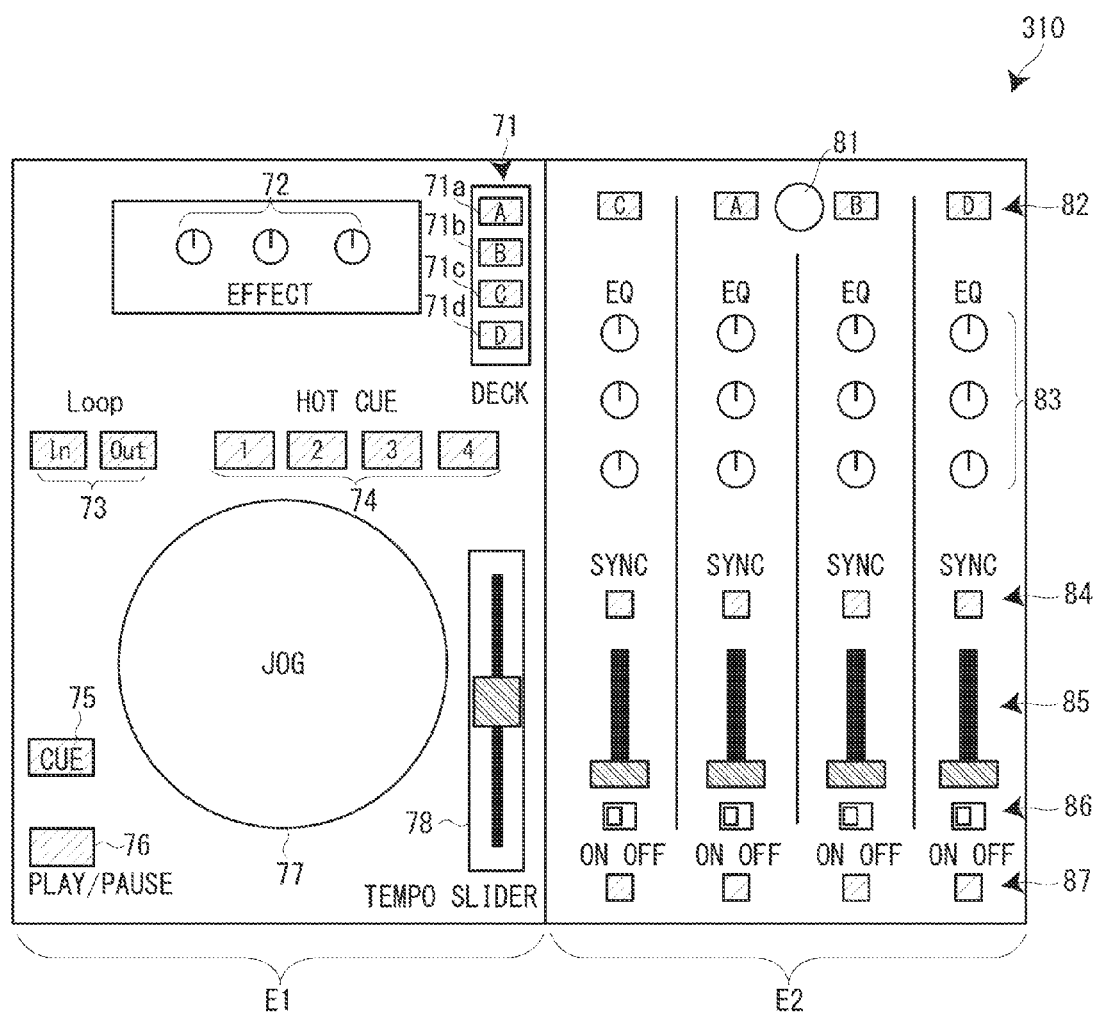
FIG. 9 is a plan view of the DJ controller according to the fourth embodiment.

Referring to FIG. 9, the fourth embodiment of the invention will be explained. FIG. 9 is a plan view of a DJ controller 310 according to the fourth embodiment. The DJ controller 310 of the embodiment has only one deck area E1. Four buttons as deck switching button 71 (deck switching operation member) are arranged at the upper right portion of the deck area E1. For example, when a deck switching button 71a arranged at the top portion is pressed, the deck area E1 functions as deck corresponding to the channel A, and when a deck switching button 71b arranged below is pressed, the deck area E1 functions as deck corresponding to the channel B. Likewise, when a deck switching button 71c is pressed, the deck area E1 functions as deck corresponding to the channel C, and when a deck switching button 71d is pressed, the deck area E1 functions as deck corresponding to the channel D. As such, it is possible to correspond to either one of the four channels which can be mixable by the operation of the deck switching button 71.

Thus, the DJ controller 310 according to the fourth embodiment of the invention can correspond to the four channels with one deck, it is possible to make the device structure smaller and to reduce the device cost.

In the fourth embodiment above, one deck can correspond to the four channels, but the number of channels which can be corresponded to may be more than or less (structure which can correspond to two or three channels) than four channels.

Likewise, the two decks are assigned to (can deals with) the respective two channels in the first embodiment above, but, in the DJ controller 10 installed with a plurality of decks as such, each deck may have a structure which can deal with equal to or more than three channels.

Further, in case that a plurality of decks are installed, a structure which can deal with the different number of channels depending on a deck may be used such that one deck deals with only one channel and other decks deal with two channels.

Still further, it is possible to mix the number N of channels as mixer, but the deck operations may be available in a portion thereof. For example, mixing of five channels of A-E can be possible, but the deck operations may be available only in the four channels A-D among them. In this case, the channel E is operated only as mixer (corresponding operation member area by channel).

Furthermore, a channel corresponding to each deck may be settable at random by the user. In this case, it is preferable that the channel can be set by operation members installed in the DJ controllers 10, 110, 310 or operation devices in the PC 20. In the third embodiment, since the PC 20 is not connected, it is preferable that the channel can be set by the operation members installed in the DJ player/mixer 210.

Fifth Embodiment

Figure 10:
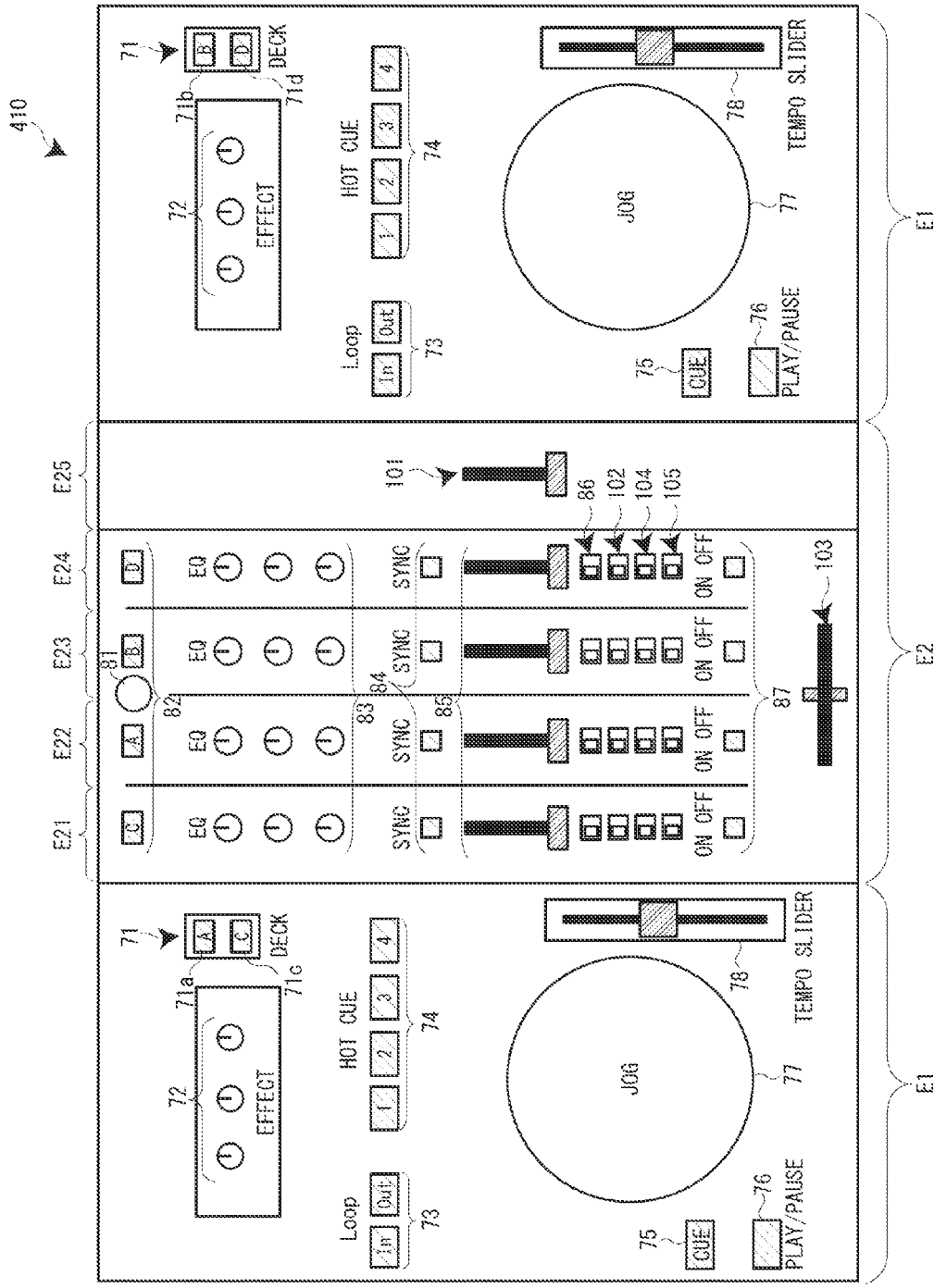
FIG. 10 is a plan view of the DJ controller according to the fifth embodiment.

Referring to FIGS. 10 to 12, the fifth embodiment of the invention will be explained. As compared with the first embodiment, a DJ controller 410 of the embodiment has a channel fader for plural operation 101 (fader operation member for plural operation), a channel fader start ON/OFF switch for plural operation 102 (plural operation fader start switching operation member), a cross fader 103 (cross fader operation member), two kinds of cross fader start ON/OFF switches 104 and 105 (an assignment switching operation member for the first end and an assignment switching operation member for the second end).

The channel fader for plural operation 101 is a operation member for realizing the fader start function simultaneously to a plurality of channels and is arranged in an independent operation area E25 independent from the operation member areas by channel E21 to E24. The channel fader start ON/OFF switch for plural operation 102 is an operation member for switching validation/invalidation of the fader start function by the channel fader for plural operation 101 and is arranged in the operation member area by channel E21 to E24 of each channel.

For example, in case that the channel fader start ON/OFF switch for plural operation 102 is set to "OFF" at the channel A, and the channel fader start ON/OFF switch for plural operation 102 is set to "ON" at the channels B, C and D, when the channel fader for plural operation 101 is moved from the bottom end to upper, the channels B, C and D start to reproduce from the cue point at the same time. Further, when the channel fader for plural operation 101 is moved to the bottom end, the channels B, C and D return to the cue points simultaneously to be in the wait state. The operation of the channel fader for plural operation 101 is invalidated for the channel A.

While, the cross fader 103 is an operation member for adjusting mixing rate of the audio signals loaded in each channel, and is arranged at a lower side of the operation member areas by channel E21 to E24 (an area excluded from the operation member areas by channel E21-E24). Further, in general, as to the cross fader 103, a fader position is set at the left end, the volume value of the audio signals assigned to the left side is set as MAX and the volume value of the audio signals assigned to the right side is set to 0. On the contrary, the fader position is set at the right end, the volume value of the audio signals assigned to the left side is set to 0 and the volume value of the audio signals assigned to the right side is set to MAX.

The cross fader start ON/OFF switches 104 and 105 are operation members for switching each channel to assign to either the left side or the right side of the cross fader 103, and are arranged in the operation member area by channel E21-E24 of each channel. For the cross fader start ON/OFF switches 104 and 105, there are the cross fader start ON/OFF switch for the left side 104 for switching whether or not to assign to the left side (the first end) of the cross fader 103 and the cross fader start ON/OFF switch for the right side 105 for switching whether or not to assign to the right side (the second end) of the cross fader 103.

For example, in case that the cross fader start ON/OFF switch for the left side 104 is set to "ON" at the channel A, and the cross fader start ON/OFF switch for the right side 105 is set to "ON" at the channels B, C, and both of the cross fader start ON/OFF switches 104 and 105 are set to "OFF" at the channel D, when the cross fader 103 moves from the right end to the left, the channel A start to reproduce from the cue point. On the other hand, when the cross fader 103 moves from the left end to the right, the channels B and C start to reproduce from the cue point. Further, when the cross fader 103 is at the left end, the channel A is in the reproduction state and the channels B and C are in the wait state at the cue point. On the contrary, when the cross fader 103 is at the right end, the channels B and C are in the reproduction state and the channel A is in the wait state at the cue point. Still further, when the cross fader 103 is in a position other than the left end and the right end, the channels A, B and C are in the reproduction state and the volume value is set based on the position of the cross fader 103. As to the channel D of which the cross fader start ON/OFF switch for the left side 104 and the cross fader start ON/OFF switch for the right side 105 are not set to "ON", the operation of the cross fader 103 is invalidated. Since the two kinds of cross fader start ON/OFF switches 104 and 105 for the left side and the right side are provided, it is possible to assign a same channel to the both ends of the cross fader 103 (to set the cross fader start ON/OFF switches 104 and 105 to "ON" for the same channel).

Figure 11A:
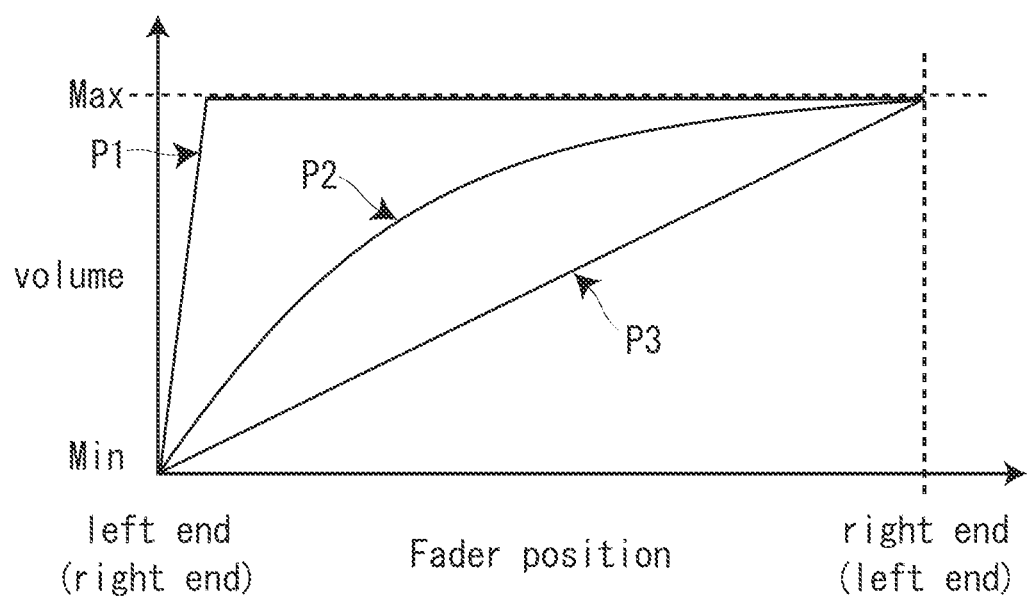
FIGS. 11A and 11B are graphs illustrating curve characteristic differences between a cross fader and a channel fader.
Figure 11B:
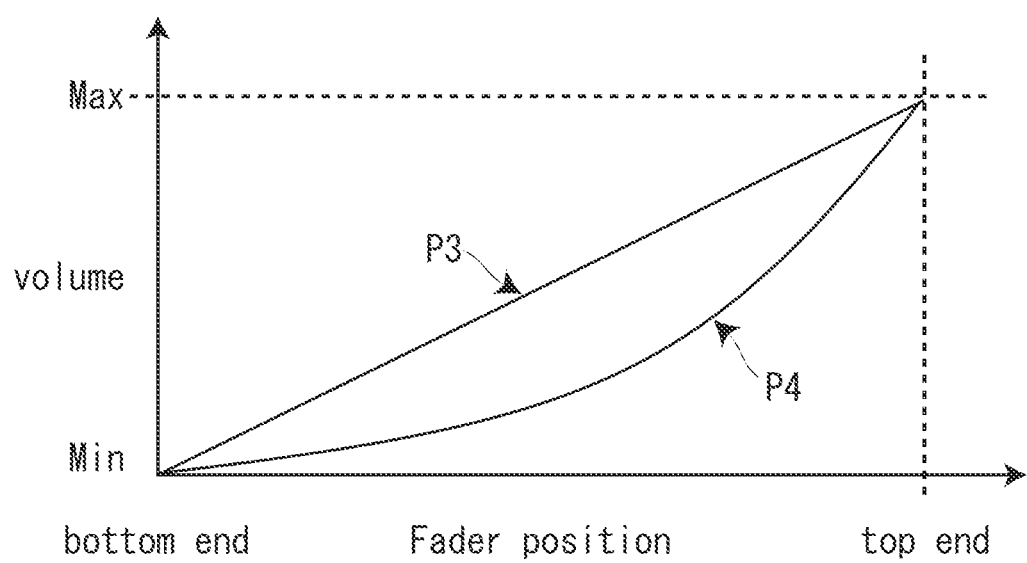
Figure 12A:
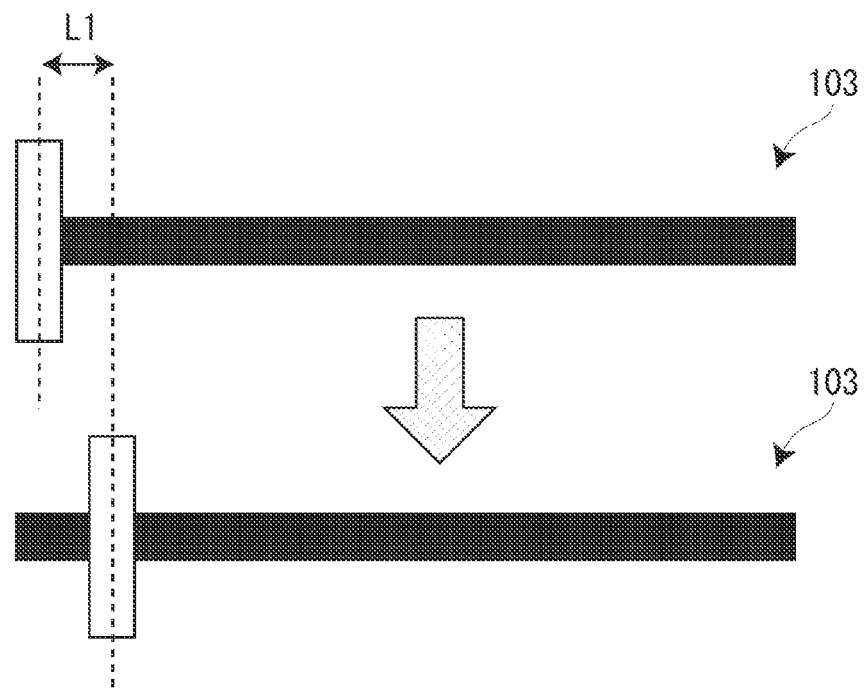
FIGS. 12A and 12B are graphs illustrating fader movement amount differences between the cross fader and the channel fader.
Figure 12B:
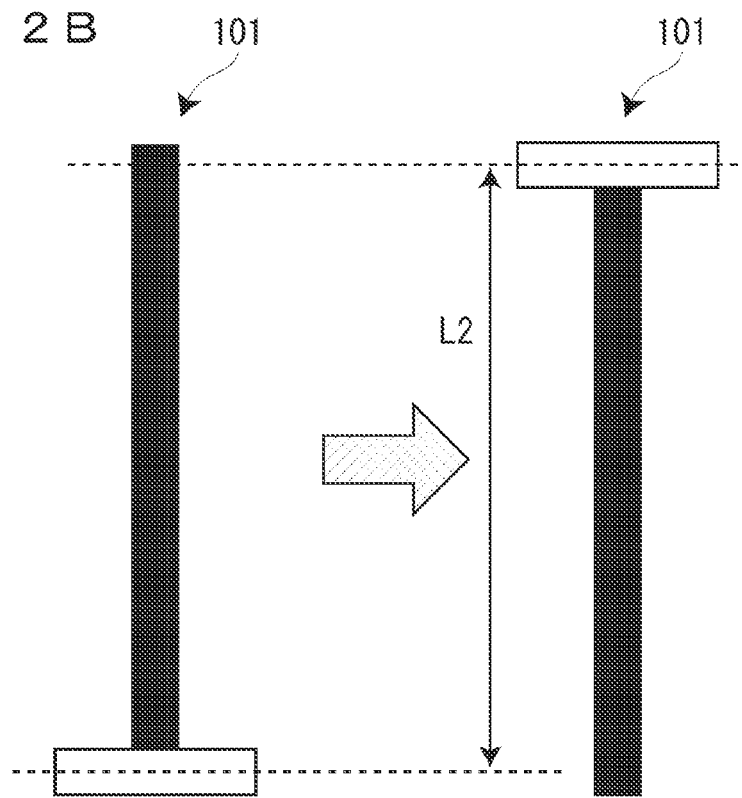

Referring to FIGS. 11A, 11B, 12A and 12B, a difference between the cross fader 103 and the channel fader for plural operation 101 will be explained. FIGS. 11A and 11B illustrate respective curve characteristics, and FIGS. 12A and 12B illustrate a movement amount of each fader. FIG. 11A is a graph illustrating curve characteristics of the cross fader 103. In the embodiment, either one of the curve characteristics P1 to P3 as illustrated can be selected/set for the cross fader 103.

The selection of the curve characteristics is done with a setting screen of the DJ application 21 or by the operation member provided on the DJ controller 410. While, as illustrated in FIG. 11B, the curve characteristic P3 or P4 can generally be selected for the channel fader for plural operation 101. Similarly, the curve characteristics can be selected for the channel fader by channel 85 (the curve characteristic of the channel fader for plural operation 101 may be in common with or may be independently from the curve characteristics of the channel fader by channel 85). Thus, as compared with the channel fader for plural operation 101, the curve characteristics of the cross fader 103 can generally be set with a comparatively precipitous leading edge.

For example, in case that the P1 is selected as curve characteristic for the cross fader 103, the volume value can be set to MAX only by slightly raising (moving only the length of L1) the cross fader 103 from the state that the cross fader 103 is 0 (see FIG. 12A). While, the channel fader for plural operation 101 needs to be raised to set the volume value to MAX (the fader needs to be moved by L2 corresponding to a full length in a moving range of the fader).

From such a difference of characteristics, when the cross fader 103 is set to the precipitous curve such as P1, it is easily possible to generate and cut sounds instantly. For example, it is possible to realize performance such that the hot cue button 74 on the deck area E1 is struck repeatedly by repeating operations in which the fader is moved a little rapidly from an end to reproduce from the cue point, is returned to the end instantly to be in the cue wait state, is moved instantly again, is returned to the end instantly and so on. Shortly, a plurality of tracks can be generated and cut promptly at the same time by setting a plurality of channels to "ON" with the cross fader start ON/OFF switches 104 and 105, leading to enhancing musical expressions.

Thus, since the DJ controller 410 according to the fifth embodiment of the invention has the channel fader for plural operation 101 capable of operating a plurality of channels simultaneously and the cross fader 103, performance with more originality can be realized. Especially, the more the channels are installed, the higher enhancing effect of operability becomes based on the installation of these faders 101 and 103. Further, by taking advantage of the characteristics of each fader 101 and 103, it is possible to take on different usage such that the channel fader for plural channel 101 is used for channels which are desired to mix at a certain period, and the cross fader 103 is used for channels which are desired to generate and cut sounds expeditiously, resulting in widening reverse side deck performance.

Further, since the channel fader start ON/OFF switch for plural operation 102 and the cross fader start ON/OFF switches 104 and 105 are arranged in each operation member area by channel E21 to E24 in correspondence to each channel, a layout space problem can easily be resolved and a setting state per channel can easily be discriminated even many channels are provided.

In the embodiment above, the two cross fader start ON/OFF switches 104 and 105 are used as switching device for channels to assign to the cross fader 103, but may be switchable by one switch. In this case, a cross fader start ON/OFF switch (not illustrated) which can switch to three assignments as an assignment to the left side, an assignment to the right side and through (assigning to neither side) may be installed.

In the embodiment above, the channel fader start ON/OFF switch for plural operation 102 is provided per channel, but one channel fader start ON/OFF switch for plural operation to all channels in common may be provided.

Further, in the embodiment above, each fader start ON/OFF switch 102, 104 or 105 is exemplified having the operation member physically moved to right and left, but the operation member may have any formation such that ON/OFF is switched by pressing a button and the like. In case ON/OFF is switched by pressing the button, it is preferable that the user can acknowledge an assignment state such that the button or an LED provided to correspond to the button is turned on when the button is ON, and the button or the LED is turned off when the button is OFF.

Sixth Embodiment

Figure 13:
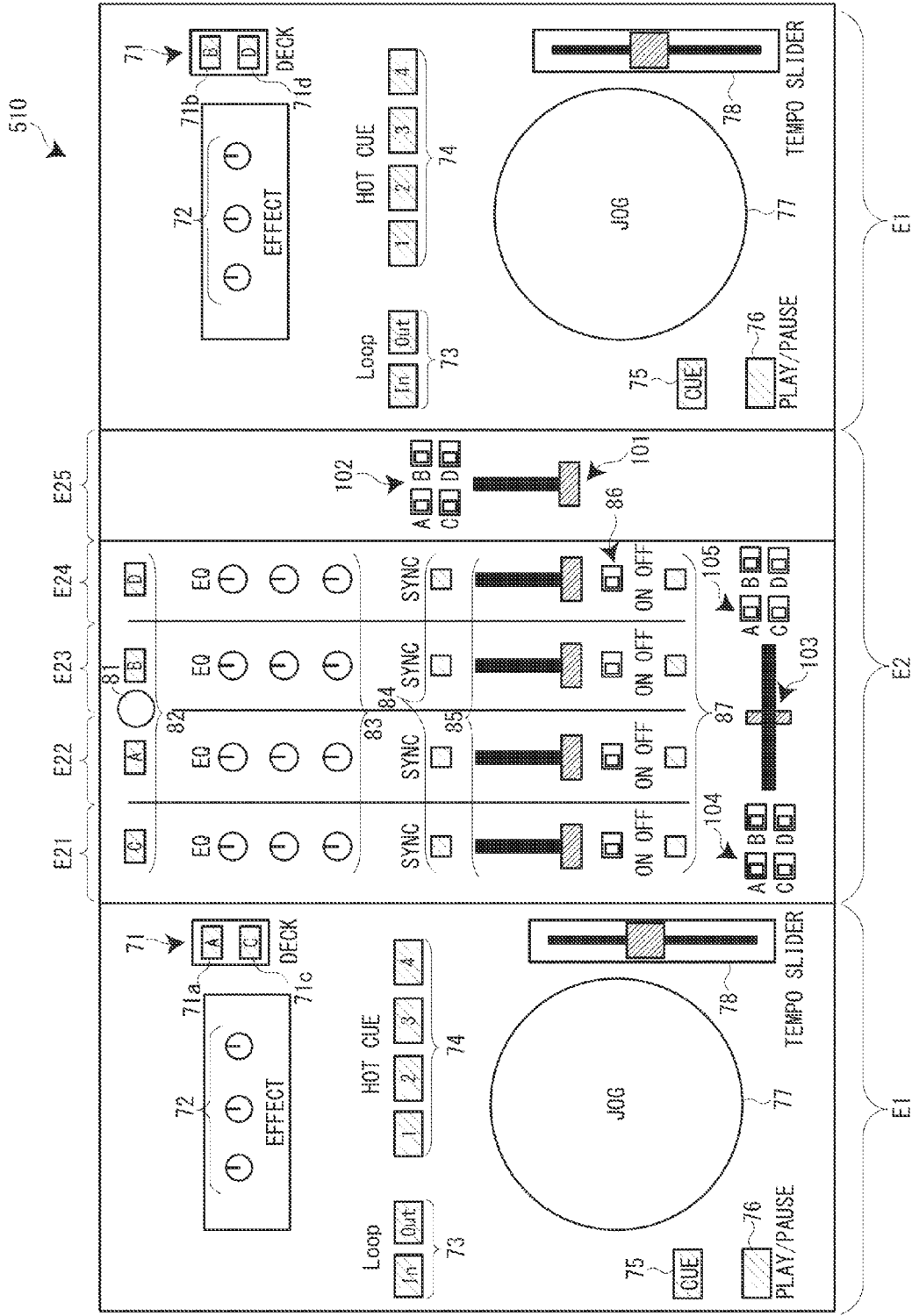
FIG. 13 is a plan view of the DJ controller according to the sixth embodiment.

Referring to FIG. 13, the sixth embodiment of the invention will be explained. As compared with the fifth embodiment, a DJ controller 510 of the embodiment has different arrangements of the channel fader start ON/OFF switch for plural operation 102 and the cross fader start ON/OFF switches 104 and 105. As illustrated in FIG. 13, in the embodiment, the channel fader start ON/OFF switch for plural operation 102 equal to the number of all channels is arranged adjacent to the channel fader for plural operation 101 in the independent operation area E25. Further, the cross fader start ON/OFF switch for the left side 104 equal to the number of all channels is arranged adjacent to the left end of the cross fader 103, and the cross fader start ON/OFF switch 105 equal to the number of all channels is arranged adjacent to the right end of the cross fader 103. Four-channel arrangements included in each fader start ON/OFF switch 102, 104 and 105 are the same, a switch at the upper left corresponds to the channel A, a switch at the upper right corresponds to the channel B, a switch at the lower left corresponds to the channel C, and a switch at the lower right corresponds to the channel D, respectively.

Thus, in the DJ controller 510 according to the sixth embodiment of the invention, since the channel fader start ON/OFF switch for plural operation 102 equal to the number of all channels is arranged adjacent to the channel fader for plural operation 101, and the cross fader start ON/OFF switches 104 and 105 equal to the number of all channels are arranged adjacent to each end of the cross fader 103, the user can easily discriminate an assignment state of each channel. Further, the switches equal to the number of all channels are arranged integrally, leading to high operability.

The first to sixth embodiments are described above, but each embodiment may be combined. Further, in each embodiment above, the fader start function is realized by the channel fader 85, the channel fader for plural operation 101 and the cross fader 103, but a play button (play operation member) may be arranged in place of the channel faders 85 and 101. In this case, the channel fader start ON/OFF switches 86 and 102 are unnecessary and the channel faders 85 and 101 are used only for volume adjustment.

Further, in each embodiment above, the channel fader start ON/OFF switch 86 is provided per channel, but only one channel fader start ON/OFF switch (switch for validation/invalidation of each channel fader 85, which is different from the channel fader start ON/OFF switch for plural operation 102 above) may be provided for all channels in common.

Still further, in each embodiment above, the DJ controllers 10, 110, 310, 410 and 510, and DJ player/mixer 210 dealing with the audio signals are exemplified as operation devices, but equipment dealing with video signals (for example, VJ equipment with which a visual jockey mixes (synthesizes or links) videos along with music extemporaneously) can be also adapted. DVJ equipment dealing with both audio signals and video signals can be adapted.

Still further, the DJ controllers 10, 110, 310, 410 and 510, and DJ player/mixer 210 illustrated in each embodiment above have structures with the deck switching button 71, but the deck switching button 71 is not necessarily provided. For example, a structure may be used, in which two decks and a three channel mixer are provided and one channel is operated by only the mixer (corresponding operation member area by channel).

Finally, the functions of the DJ controllers 10, 110, 310, 410 and 510 and the DJ player/mixer 210 may be provided as a program. The program may be provided to store in various recording medium (such as a CD-ROM, a flash memory). In other words, a program which makes a computer function as each structure element of the DJ controllers 10, 110, 310, 410 and 510 and the DJ player/mixer 210 and a recording medium in which the program is recorded are included in a scope of rights of the invention. In addition, modifications and changes such that an electronic instrument other than DJ equipment or an application (software) operable on a computer realizes the operation device of the invention are applicable in a range without departing from a scope of the invention.

REFERENCE NUMERALS 10, 110, 310, 410, 510: DJ controller 11: deck section 12: mixer section 13: audio I/F section 21: DJ application 71: deck switching button 82: load button 84: synchronization button 85: channel fader 86: channel fader start ON/OFF switch 87: cue select button 106: cue point 210: DJ player/mixer D: display screen E1: deck area E2: mixer area E21 to E24: operation member area by channel SY: DJ system

What is claimed is:

1. An operation device comprising:
one or more deck areas or being connected to the one or more deck areas;
a reproduction control system in which a number of channels is more than a number of the deck areas;
a play operation member that instructs the reproduction control system to reproduce a loaded reproduction signal corresponding to each channel for a number of channels; and
a cue point select operation member that instructs the reproduction control system to select a cue point as a reproduction start position out of cue point candidates corresponding to each channel for the number of channels.

2. The operation device according to claim 1, wherein the play operation member is a fader operation member that realizes a fader start function.

3. The operation device according to claim 2 further comprising a fader start switching operation member that switches validation/invalidation of the fader start function corresponding to each channel or all channels.

4. The operation device according to claim 1 further comprising a fader operation member for plural operation that realizes a fader start function simultaneously to a plurality of channels.

5. The operation device according to claim 4 further comprising a fader start switching operation member for plural operation that switches validation/invalidation of the fader start function by the fader operation member for plural operation corresponding to each channel or all channels.

6. The operation device according to claim 5, wherein the fader start switching operation member for plural operation is arranged adjacent to the fader operation member for plural operation.

7. The operation device according to claim 1 further comprising a cross fader operation member that adjusts a mixing rate of the reproduction signal loaded in each channel, and an assignment switching operation member that switches whether to assign each channel to either a first end or a second end of the cross fader operation member.

8. The operation device according to claim 7, wherein the assignment switching operation member has an assignment switching operation member for a first end that switches whether to assign to the first end of the cross fader operation member and an assignment switching operation member for a second end that switches whether to assign to the second end of the cross fader operation member, and the assignment switching operation member for a first end and the assignment switching operation member for a second end are provided corresponding to each channel.

9. The operation device according to claim 8, wherein the assignment switching operation member for a first end of the number of channels corresponding to each channel is arranged adjacent to the first end of the cross fader operation member, and the assignment switching operation member for a second end of the number of channels corresponding to each channel is arranged adjacent to the second end of the cross fader operation member.

10. The operation device according to claim 1, wherein the operation device includes the one or more deck areas where the deck is operated and a mixer area where a mixing operation is performed, and the cue point select operation member and the play operation member are arranged in the mixer area.

11. The operation device according to claim 10, wherein the mixer area includes an operation member area by channel in which an operation member group corresponding to each channel for the number of channels is arranged in line, and the cue point select operation member and the play operation member are arranged in the operation member area by channel of a corresponding channel.

12. The operation device according to claim 11, wherein a plurality of the deck areas are installed, each deck area is preliminary assigned to two or more channels, and the deck area includes a deck switching operation member that switches to designate a channel on which the deck area serves as the deck among the two or more channels.

13. A reproduction system comprising the operation device set forth in claim 1, and a computer having a multi-channel audio/video application on a non-transitory storage medium that functions as the reproduction control system.

14. The operation device according to claim 1, including a program recorded on a non-transitory computer readable medium instructing a computer to function as the play operation member or the cue point select operation member.

* * * * *